United States Patent
Price et al.

(10) Patent No.: US 11,724,407 B2
(45) Date of Patent: Aug. 15, 2023

(54) TARGET-FREE RGBD CAMERA ALIGNMENT TO ROBOTS

(71) Applicant: Palo Alto Research Center Incorporated, Palo Alto, CA (US)

(72) Inventors: Robert Price, Palo Alto, CA (US); Kent Evans, Sunnyvale, CA (US)

(73) Assignee: Xerox Corporation, Norwalk, CT (US)

( * ) Notice: Subject to any disclaimer, the term of this patent is extended or adjusted under 35 U.S.C. 154(b) by 453 days.

(21) Appl. No.: 17/151,453

(22) Filed: Jan. 18, 2021

(65) Prior Publication Data

US 2022/0227012 A1      Jul. 21, 2022

(51) Int. Cl.
*G06F 17/00* (2019.01)
*B25J 19/02* (2006.01)
*G06T 7/80* (2017.01)

(52) U.S. Cl.
CPC ............ *B25J 19/023* (2013.01); *G06T 7/80* (2017.01); *G06T 2207/30208* (2013.01); *G06T 2207/30244* (2013.01)

(58) Field of Classification Search
CPC ......... B25J 19/023; B25J 9/1692; G06T 7/80; G06T 2207/30208; G06T 2207/30244; G06T 7/74
USPC ....................................................... 700/259
See application file for complete search history.

(56) References Cited

U.S. PATENT DOCUMENTS

| | | | | |
|---|---|---|---|---|
| 8,965,580 B2* | 2/2015 | Brooks | ................. | B25J 9/1671 |
| | | | | 700/259 |
| 8,996,175 B2* | 3/2015 | Blumberg | ............. | G05B 19/42 |
| | | | | 901/3 |
| 10,901,431 B1* | 1/2021 | Ebrahimi Afrouzi | ..... | G06T 7/73 |
| 11,348,269 B1* | 5/2022 | Ebrahimi Afrouzi | ... | G01S 17/89 |
| 11,657,531 B1* | 5/2023 | Ebrahimi Afrouzi | .. | G06V 20/64 |
| | | | | 382/284 |
| 2022/0227012 A1* | 7/2022 | Price | ..................... | B25J 9/1692 |

OTHER PUBLICATIONS

Pickit_01 (Year: 2023).*
Pickit (Year: 2023).*
Brown, Duane C. (May 1966). "Decentering distortion of lenses" (PDF). Photogrammetric Engineering. 32 (3): 444-462.
(Continued)

*Primary Examiner* — Ronnie M Mancho

(57) ABSTRACT

One embodiment provides a robotic system comprising: a robot, the robot further comprising a moveable robotic arm that moves within the robot's reference space; a depth-sensing camera, the camera having a reference frame that is in substantial view of the robot's reference space; a controller, the controller further comprising a processor and a computer readable memory that comprises instructions such that, when read by the controller, the controller inputs image data from the camera and sends signals to the moveable robotic arm, the instructions further comprising the steps of: calibrating the camera to the robot by instructing the robot to engage in a number of robot poses; extracting the location of the robot poses to obtain the robot poses in the camera reference frame; and creating a transformation that transforms robot points afterwards to camera points.

20 Claims, 6 Drawing Sheets

(56) References Cited

OTHER PUBLICATIONS

Jaehyeon Kang Nakju L. Doh, Automatic targetless camera-LIDAR calibration by aligning edge with Gaussian mixture model. Journal of Field Robotics, vol. 37, Issue 1; https://doi.org/10.1002/rob.21893, p. 158-179.

C. Park, P. Moghadam, S. Kim, S. Sridharan and C. Fookes, "Spatiotemporal Camera-LiDAR Calibration: A Targetless and Structureless Approach," in IEEE Robotics and Automation Letters, vol. 5, No. 2, pp. 1556-1563, Apr. 2020, doi: 10.1109/LRA.2020.2969164.

Zhengyou Zhang . Flexible New Technique for Camera Calibration. Technical Report MSR-TR-98-71, Microsoft Research, pp. 1-21.

R. I. Hartley, "In defense of the eight-point algorithm," in IEEE Transactions on Pattern Analysis and Machine Intelligence, vol. 19, No. 6, pp. 580-593, Jun. 1997, doi: 10.1109/34.601246.

Richard Hartley and Andrew Zisserman. Multiple View Geometry in Computer Vision. Cambridge University Press. 2nd Edition (2003), pp. 25-64.

Lui, Vincent, and Tom Drummond. 2014. "An Iterative 5-Pt Algorithm for Fast and Robust Essential Matrix Estimation.":https://www.researchgate.net/profile/Lui_Vincent/publication/269250221_An_Iterative_5-pt_Algorithm_for_Fast_and_Robust_Essential_Matrix_Estimation/links/5a120bd7a6fdccc2d79b6955/An-Iterative-5-pt-Algorithm-for-Fast-and-Robust-Essential-Matrix-Estimation.pdf—pp. 1-11.

* cited by examiner

TARGET-FREE RGBD CAMERA ALIGNMENT TO ROBOTS

BACKGROUND

The field of robotic/computer vision is well-known in the art. In order for robots to function autonomously in the world, vision systems need to be calibrated to the environment in which is seeks to operate.

In classic camera calibration, it is known that a planar target with known appearance may be placed in view of the camera. An image of the target can be used to infer the intrinsic parameters such as camera focal length and lens distortion. It can also be used to infer the extrinsic parameters of the camera, namely the displacement and rotation of the camera relative to the visual target. One traditional method is to use a checkboard pattern with a corner detector to extract the corners of the squares. A system of equations may then be solved to find the intrinsic and extrinsic parameters of the camera. If the target is placed precisely with respect to the robot, one can infer the pose of the camera relative to the robot. However, it can be difficult to get an exact measurement however, as the orientation of the robot frame is typically within its base.

SUMMARY OF THE APPLICATION

Several embodiments of the present application comprising systems and methods of robotic computer vision systems and methods are disclosed.

In one embodiment, a robotic system is disclosed that comprises: a robot, the robot further comprising a moveable robotic arm that moves within the robot's reference space; a RGBD camera, the camera having a reference frame that is in substantial view of the robot's reference space; a controller, the controller further comprising a processor and a computer readable memory that comprises instructions such that, when read by the controller, the controller inputs image data from the camera and sends signals to the moveable robotic arm, the instructions further comprising the steps of: calibrating the camera to the robot by instructing the robot to engage in a number of robot poses; extracting the location of the robot poses to obtain the robot poses in the camera reference frame; and creating a transformation that transforms robot points afterwards to camera points.

In another embodiment, a method for determining camera parameters relative to a robot is disclosed comprising the steps of: calibrating the camera to the robot by instructing the robot to engage in a number of robot poses; extracting the location of the robot poses to obtain the robot poses in the camera reference frame; and creating a transformation that transforms robot points afterwards to camera points Other features and advantages of the present system are presented below in the Detailed Description when read in connection with the drawings presented within this application.

DETAILED DESCRIPTION

The following description is presented to enable any person skilled in the art to make and use the embodiments, and is provided in the context of a particular application. Various modifications to the disclosed embodiments will be readily apparent to those skilled in the art, and the general principles defined herein may be applied to other embodiments and applications without departing from the spirit and scope of the present disclosure. Thus, the present application is not limited to the embodiments shown, but is to be accorded the widest scope consistent with the principles and features disclosed herein.

Introduction

Calibration of a camera is desirable for robotic tasks as it allows the robot to infer something about the position, size and orientation of objects from the appearance of those objects in camera images. In many cases, it is desirable for the robot planner to make inferences about where objects in camera images are relative to the robot. The present application describes herein several embodiments that allows a robot to rapidly and easily infer the extrinsic camera parameters (i.e., location and orientation) of an RGBD (Red, Green, Blue, Depth) camera relative to a robot without a separate calibration target (e.g., the checkerboard) and without the need to orient the calibration target with respect to the robot, which is essentially a second calibration problem.

In addition, other embodiments allow for the calibration to be rechecked periodically during operation of the robot under mildly restrictive conditions without the need to introduce a test pattern into the work cell. These embodiments enables a new kind of robotic work cell which is quickly setup in order to accomplish a finite task before being moved or reconfigured for a new task. The embodiments are also very fast and computationally efficient making them desirable for embedded processor applications in the field. In such embodiments, it may be desired that the extrinsic parameter estimation (e.g., as the intrinsic parameters of the camera) stay relatively constant over time and can be estimated using other methods during installation.

Embodiments of the Present Application

Figure 1:
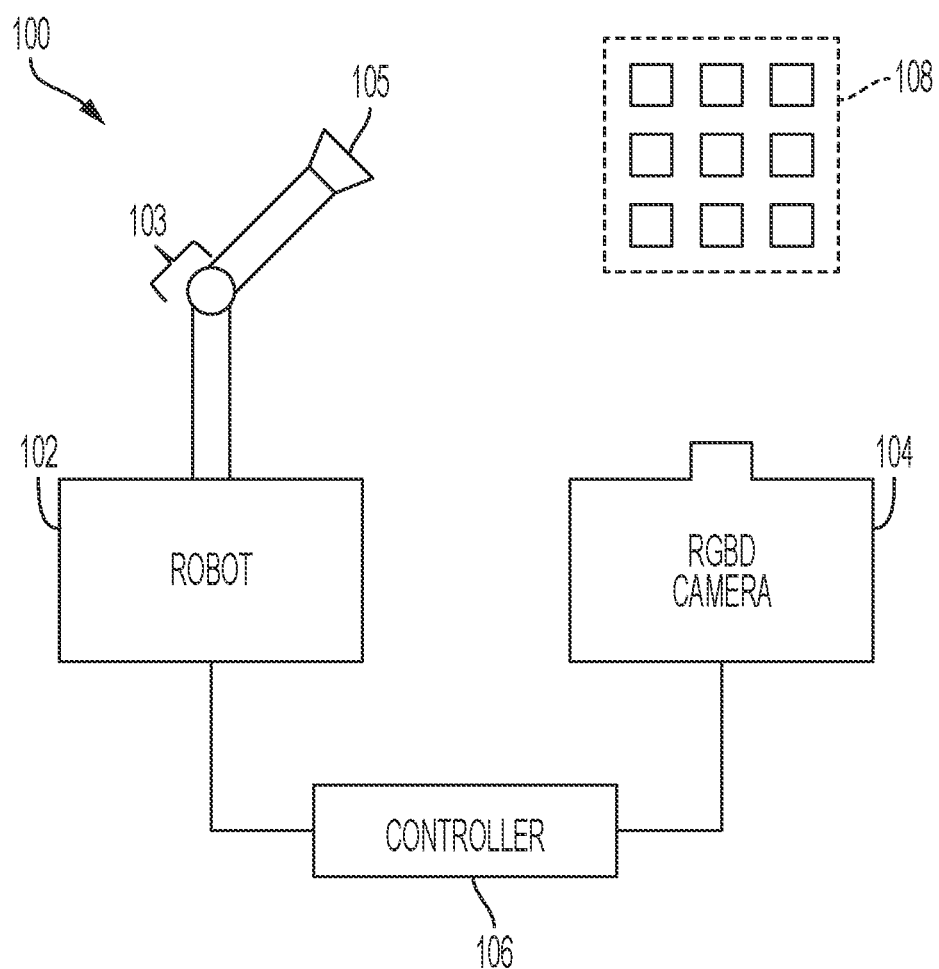
FIG. 1 shows one embodiment of a robotic system architecture as made in accordance with the principles of the present application.

FIG. 1 is a block diagram of the environment in which embodiments of the present application operate. System 100 comprises robot 102, RGBD camera 104 and controller 106. Robot 102 may be any known or future robotic system, or any portion thereof, that can move or cause objects to move under computer vision and controller operation. For example, an articulated member 103 may be moved under some motor actuation (or any other means of affecting motion) to work, e.g., on some objects of interest (not shown) to achieve some goal. Member 103 may also comprise a tip 105 which may be some piece of the member that is visible and, either through color and/or shape, is readily discernable by the camera and identified by the controller as a portion of the member that, once identified, indicates the relative position/speed of the member in space and time.

A suitable camera (e.g., RGBD) 104 may be any known or future camera system that may be able to resolve depth as well as color image data. In some embodiments, a suitable camera may comprise a single color camera together with any known depth and/or range finder. Alternatively, a suitable camera may comprise two separate color cameras and the parallax of the two images may be employed to discern depth information. In yet other embodiments, other cameras/sensors may be employed that operate in other parts of the electromagnetic spectrum. It suffices that the sensor system is able to discern the relevant portion of the member in space and its depth information.

In some embodiments, it may be possible to employ LIDAR data in conjunction with image data from a suitable. In such cases, it would be desirable to identify points in a LIDAR scan. Alternatively, LIDAR images which produce a 2D scan of depths and or reflectances may be employed. In this embodiment, it would be desirable to apply an object detector or other fiducial detector to the LIDAR image (e.g., either the reflectance map or the actual depths or both).

In yet other embodiments, it may not be necessary to use RGB cameras at all. Other chromatic cameras may suffice. In addition, a monochromatic camera capturing images could use an object detector, bar code detector, or other fiducial mark to define a point to be tracked across images.

Other embodiments might employ cameras having monocular depth information from images to work with RGB cameras that may not have a depth channel. In such other embodiments, a suitable camera may employ monocular depth estimation in specific domains so it may be possible to employ them without a depth camera.

In all of these various embodiments, the present application employs the term "depth-sensing camera" to encompass all of the above—e.g., RGBD cameras, other chromatic cameras with depth data, LiDAR data/images, monochromatic cameras, monocular depth, etc.

As may be seen, controller 106 may comprise a processor and computer readable memory which stores many of the processes and/or routines described herein. Controller 106 inputs image and depth data from RGBD camera 104 and, depending upon the task at hand, sends control signals to the robot 102 to effect the movement of the robot and/or any part thereof.

As will be described herein, the calibration of the RGBD camera and robot may proceed under the various processes and/or routines as described herein. Also shown is a target 108, which is often employed in prior art systems. Optional target 108 may be employed; but is not necessarily a part of any embodiment and may be excluded altogether, in order to calibrate the system.

Figure 2A:
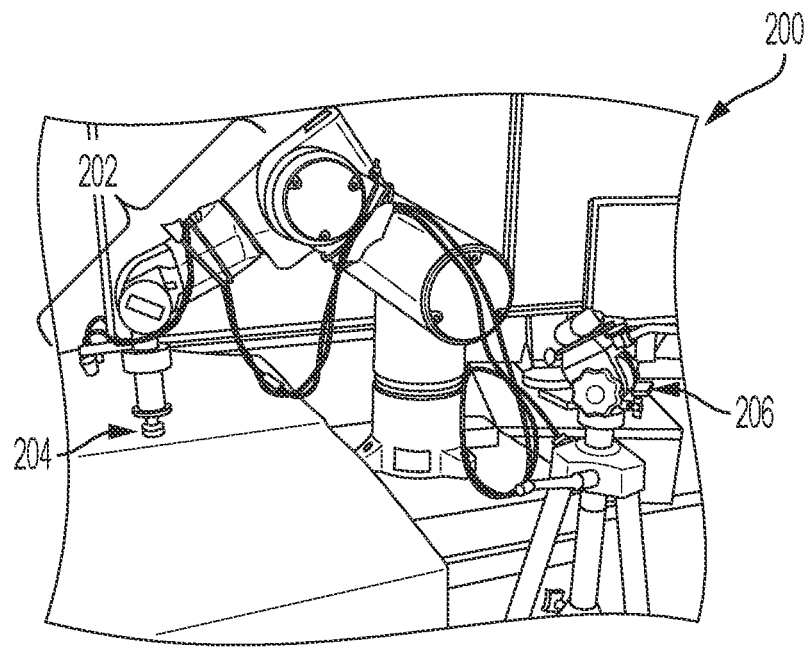
FIGS. 2A and 2B show one embodiment of an actual robotic system with camera and a representation of the camera with respect to the robotic system, respectively.

FIG. 2A shows one view of an actual robotic system 200 comprising an articulating member 202 and at the distal end, a tip 204. Tip 204 may be made of a particular shape and/or color that may be easily discernable by the controller when image data is captured by camera 206. As may be seen, camera 206 may be offset from the robot and the member. It suffices that the relative positioning and orientation of the camera to the robot be understood by the controller. One goal may be to find this positioning, as it may not be known before the algorithm executes.

Figure 2B:
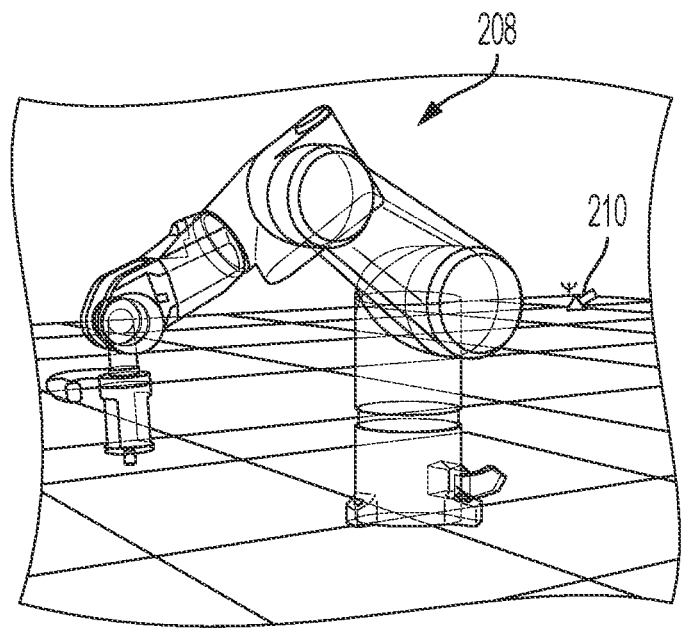
Figure 3:
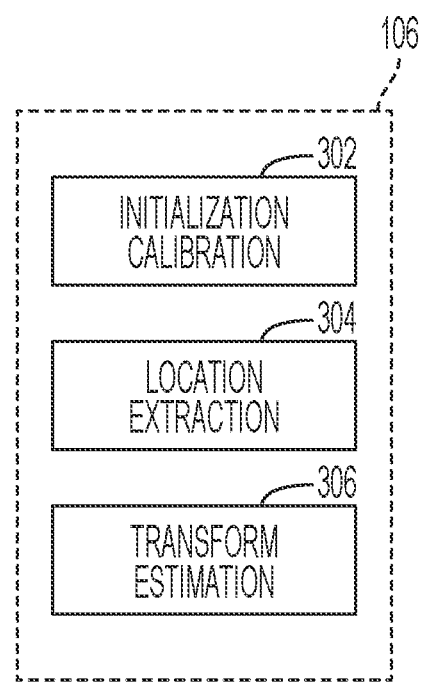
FIG. 3 shows one embodiment of a controller with a plurality of processing modules as made in accordance with the principles of the present application.

FIG. 2B is one embodiment of a representation of the robot to the camera as may be understood by the controller. In this figure, the robot's representation is shown at 208 and the system's inference of the camera location and orientation is shown at 210 with respect to 208. It should be appreciated that other representations are possible and that the present application should not be limited to the representation shown herein. It suffices that sufficient information be understood by the controller as to the orientation of the camera to the robot or parts thereof FIG. 3 is one embodiment of a controller made in accordance with the principles of the present application. Controller 106 comprises several modules and/or routines that affect the processing and control of the robotic systems in question. As part of controller 106, there are modules for the initialization and calibration 302 (both initially and as an on-going process during the course of the robot carrying out its programmed functions), location extraction 304 and transform estimation 306. In many of the embodiments described herein, some combination of these modules may comprise the modules of a controller that operates under the principles of the present application.

Calibration Embodiments

For many of the calibration embodiments described, the present application may assume that the system has some camera with depth sensing and that the camera has a view of the robot and/or any portion that moves. As mentioned, these embodiments replace the use of corner points of a known calibration pattern (e.g. target 108). Instead, many embodiments may employ points generated by the robot at known 3D locations to directly align the camera with the robot frame—without the use of a target and the consequent need to align the target to the robot.

Sample Generation Function Embodiment

Figure 4:
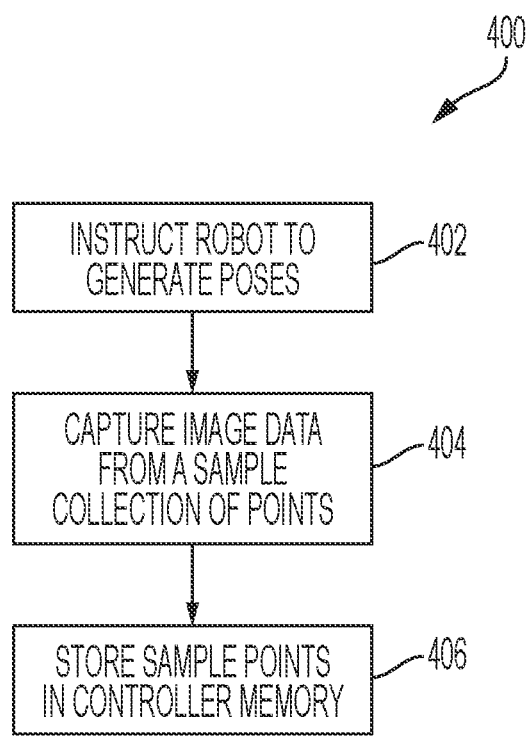
FIG. 4 depicts one embodiment of an initialization/calibration routine and a sample initialization, as performed in accordance with the principles of the present application.

In one embodiment of an initialization/calibration module, the controller may employ a sample generation module. FIG. 4 is one embodiment of a flowchart (400) of such a suitable module. At step 402, the module sends instructions to a robot to generate a series of poses. In many embodiments, this could be affected by a wheeled robot moving, or a robot arm or other type of actuated device moving in space and time. These motions would be made within the image capture of the camera system and, at 404, these poses are captured as a collection of points in space. In one embodiment, such poses and/or motions may occupy a significant part of the robot work space. It may be desirable that these image samples are points that are not coplanar or collinear.

In embodiments that involve, e.g., a robot arm, it may be desired for the controller to instruct the arm (and possibly a robot tool tip, e.g. 105) trace the vertices of a cube where the points on the cube are not coplanar or collinear in the view of the camera system. In some cases, it may also be desirable to add some additional random points to provide a good sample. In many embodiments, the number of sample points may vary, depending on the robot and the application. For example, in one embodiment, it may be desirable to take at least 8 points. In other embodiments, it may be desirable to take more than 8 points, (e.g., 12 or more sample points), to improve robustness against the possibility of camera errors. As an end result at 406, the controller stores a set of 3D points as follows:

$$X_R = [X_{R1}, X_{R2}, \ldots, X_{Rn}],$$

where each point $X_{Ri}$ has three dimensions, $X_{Ri(1)}$, $X_{Ri(2)}$, $X_{Ri(3)}$.

As mentioned previously, any part of the robotic system that is moving may be a suitable target for retrieving these sample points. In one embodiment, the part that the camera system is focusing on may comprise one or more colored materials that are sufficiently distinct from other colored objects in the robot's work space. In another embodiment, it may be possible for the camera system to focus on the shape of the target. For example, the object could be a nicely rounded object that provides a smooth edge for detecting. In another embodiment, the target could have a very distinct contour sufficient for ease of edge detection.

Location Extraction Embodiments

Figure 5:
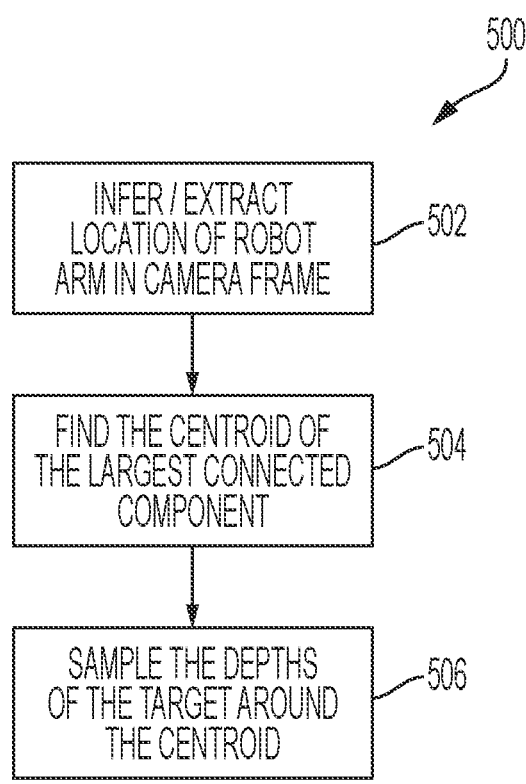
FIG. 5 is one embodiment of a flowchart of a location extraction routine as made in accordance with the principles of the present application.

In further reference to FIG. 5, the location extraction module (500) infers locations from the robot poses to get locations in the camera reference frame at 502. In one embodiment, the locations may be extracted in two steps. First the target may be localized in the image frame within a specific window. This may be done using a variety of methods such as object detection on the appearance of the robot tool tip, or simpler color histogram blob matching. In one embodiment, for example, it is possible to use color histogram matching to find a designated color (e.g., blue) suction cup on the tip of the robot, e.g., making the robot itself the target.

In other embodiments, a high contrast target, a light emitter or other easily tracked affordance may be added to the robot. Specifically, it is possible to filter in HSV space on hue, saturation and value, apply a binary filter and then use morphological operators to improve the consistency of detection. It is then possible to use a connected components algorithm to find the centroid of the largest connected component at 504.

Once the target has been identified in a window containing the target, it is possible to sample depths from the camera's depth function around the centroid of this window at 506. It may be desirable to throw out points that have bad depth readings (e.g., in the case of stereo depth cameras, it may be that correspondences could not reliably be found for certain parts of the image). It is then possible to use a robust estimation technique to infer the depth of the target from the camera.

In one embodiment, it is possible to use a percentile function to find the depth of the 30th percentile points, but other robust estimation techniques may be used. In some instances, this may be robust to outliers and may prefer points that are closer to the camera which allow the algorithm to ignore distant points that might occur on smaller non-convex objects or imaginary distance points caused by specular reflection of robot features. In some cases, if there are not enough points to provide a reliable depth estimate, then the point may be thrown out. The end result is a set of points in the camera frame corresponding substantially to the points in the robot frame designated as follows:

$$X_C = [X_{C1}, X_{C2}, \ldots, X_{Cn}]$$

Transform Estimation Embodiments

Figure 6:
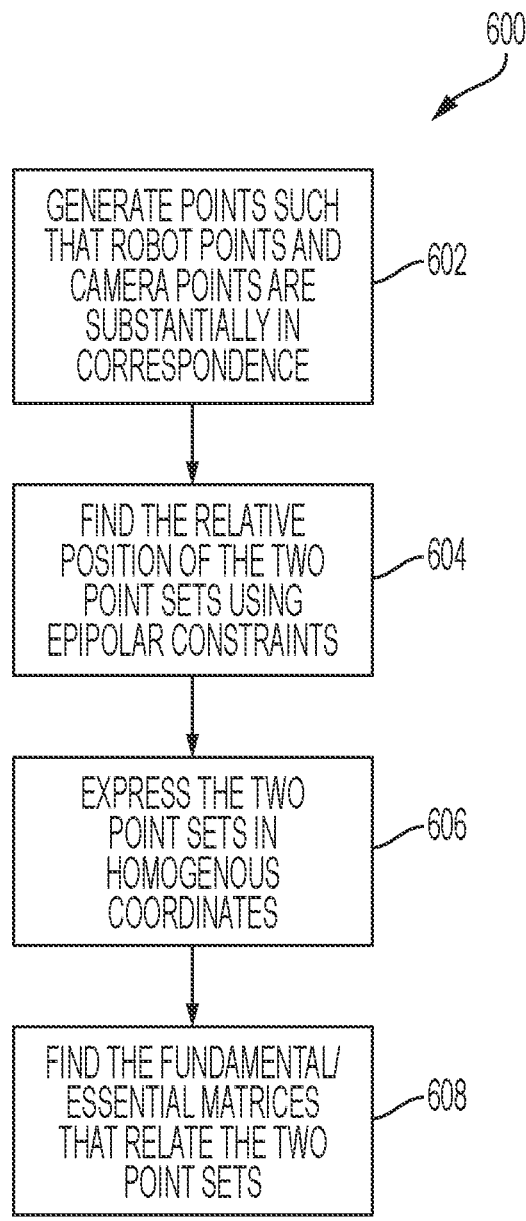
FIG. 6 is one embodiment of a flowchart of a transform estimation routine as made in accordance with the principles of the present application.

In further reference to FIG. 6, the transform estimation module 600 finds a rigid transform from the robot points $X_R$ to the camera points $X_C$. In one embodiment, it may be desirable to generate the points such that the robot traces have a substantial correspondence between robot points and points in the camera frame at 602. This tends to simplify the problem of finding the transformation. The robot frame and the camera frame form an epipolar geometry in which points in the world fall along respective lines. The relative position of the two point sets can be found from the epipolar constraints at 604 using a conventional 8-point algorithm— which is sufficiently robust to small errors. Traditionally, the 8-point algorithm is used with two sets of points based on camera images, but fundamentally any two sources of 3D points may be used. It is possible to express the points for both robot and camera in homogeneous coordinates at 606 and then find the fundamental and essential matrices that relate the two sets of points at 608. Due to sign symmetries, there may be generally four solutions. It is possible to select the matrix that results in positive depths during re-projection, as no point can appear in the camera image and be behind the camera. In the case that the selection may be ambiguous, it is possible to provide a visualization to the user to choose a transformation that fits best.

Alternative Embodiments

In another embodiment, the conventional Essential/Fundamental matrices may be optionally used as the starting point for iterative methods to further reduce re-projection errors.

In this embodiment, once the rigid transform has been extracted, it is possible to test it by re-projecting robot coordinates to the camera (or vice-versa) and measure the error between projections and the measured camera locations. If this error is under a desired threshold, then the transform may be published to the robotic system—thereby allowing it to now use detections from the camera to inform its world model and, indirectly, its plans.

Now that various embodiments have been herein disclosed, it is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a controller, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the controller, processor, computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

A detailed description of one or more embodiments of the application, read along with accompanying figures, that illustrate the principles of the application has now been given. It is to be appreciated that the application is described in connection with such embodiments, but the application is not limited to any embodiment. The scope of the application is limited only by the claims and the application encompasses numerous alternatives, modifications and equivalents. Numerous specific details have been set forth in this description in order to provide a thorough understanding of the application. These details are provided for the purpose of example and the application may be practiced according to the claims without some or all of these specific details. For the purpose of clarity, technical material that is known in the technical fields related to the application has not been described in detail so that the application is not unnecessarily obscured.

The invention claimed is:

1. In a robotic system whose motions are autonomously controlled via images captured by a depth-sensing camera system, a method for determining camera parameters relative to a robot, the steps comprising:
    calibrating the camera to the robot by instructing the robot to engage in a number of robot poses;
    extracting the location of the robot poses to obtain the robot poses in the camera reference frame; and
    creating a transformation that transforms robot points afterwards to camera points.

2. The method of claim 1 wherein calibrating the camera to the robot further comprises sending instructions to the robot to pose at points in 3D space that are not collinear.

3. The method of claim 1 wherein calibrating the camera to the robot further comprises sending instructions to the robot to pose at points in 3D space that are not coplanar.

4. The method of claim 1 wherein calibrating the camera to the robot further comprises sending instructions to the robot to pose at points in 3D space that are substantially occupy the robot work space.

5. The method of claim 1 wherein calibrating the camera to the robot further comprises sending instructions to the robot to pose at least 8 points in 3D space that substantially form a cube in the robot work space.

6. The method of claim 1 wherein calibrating the camera to the robot further comprises obtaining a set of 3D points as follows:

$$X_R = [X_{R1}, X_{R2}, \ldots, X_{Rn}],$$

where each point $X_{Ri}$ has three dimensions, $X_{Ri(1)}$, $X_{Ri(2)}$, $X_{Ri(3)}$.

7. The method of claim 1 wherein extracting the location of the robot poses to obtain the robot poses in the camera reference frame further comprises localizing a target on the robot in an image frame within a specific window.

8. The method of claim 7 wherein localizing a target on the robot in an image frame within a specific window further comprises detecting a known object on the tip of the robot tool.

9. The method of claim 7 wherein localizing a target on the robot in an image frame within a specific window further comprises identifying a desired color blob on the tip of the robot tool.

10. The method of claim 7 wherein extracting the location of the robot poses to obtain the robot poses in the camera reference frame further comprises finding the centroid of the largest connected component of the robot tool.

11. The method of claim 10 wherein extracting the location of the robot poses to obtain the robot poses in the camera reference frame further comprises sampling the depths of the target from the depth-sensing camera around the centroid.

12. The method of claim 11 wherein extracting the location of the robot poses to obtain the robot poses in the camera reference frame further comprises generating a set of points in the camera frame as follows:

$$X_C = [X_{C1}, X_{C2}, \ldots, X_{Cn}].$$

13. The method of claim 1 wherein creating a transformation that transforms robot points afterwards to camera points further comprises finding a transformation of robot points $X_R = [X_{R1}, X_{R2}, \ldots, X_{Rn}]$ to camera points $X_C = [X_{C1}, X_{C2}, \ldots, X_{Cn}]$.

14. The method of claim 13 wherein creating a transformation that transforms robot points afterwards to camera points further comprises finding the relative position of the two point sets using epipolar constraints.

15. The method of claim 14 wherein creating a transformation that transforms robot points afterwards to camera points further comprises expressing the robot points and camera points in homogenous coordinates.

16. The method of claim 15 wherein creating a transformation that transforms robot points afterwards to camera points further comprises finding the fundamental/essential matrices from the homogenous coordinates.

17. A robotic system comprising:
    a robot, the robot further comprising a moveable robotic arm that moves within the robot's reference space;
    a depth-sensing camera, the camera having a reference frame that is in substantial view of the robot's reference space;
    a controller, the controller further comprising a processor and a computer readable memory that comprises instructions such that, when read by the controller, the controller inputs image data from the camera and sends signals to the moveable robotic arm, the instructions further comprising the steps of:
    calibrating the camera to the robot by instructing the robot to engage in a number of robot poses;
    extracting the location of the robot poses to obtain the robot poses in the camera reference frame; and
    creating a transformation that transforms robot points afterwards to camera points.

18. The robotic system of claim 17 wherein the moveable robotic arm comprise one of a group, the group comprising:

a known detectable object on the tip of the robot arm and a desired color blob on the tip of the robot arm.

19. The robotic system of claim 17 wherein the controller finds a transformation of robot points $X_R=[X_{R1}, X_{R2}, \ldots, X_{Rn}]$ to camera points $X_C=[X_{C1}, X_{C2}, \ldots, X_{Cn}]$.

20. The robotic system of claim 19 wherein the controller creates a transformation that transforms robot points afterwards to camera points further comprises finding the fundamental/essential matrices from the homogenous coordinates.

* * * * *